US011462085B2

(12) United States Patent
Kim et al.

(10) Patent No.: US 11,462,085 B2
(45) Date of Patent: Oct. 4, 2022

(54) ANTITHEFT SYSTEM OF MOBILE ROBOT

(71) Applicant: LG ELECTRONICS INC., Seoul (KR)

(72) Inventors: Sunryang Kim, Seoul (KR); Yoonsik Kim, Seoul (KR); Hyeri Park, Seoul (KR); Woojin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 16/963,157

(22) PCT Filed: Jul. 31, 2019

(86) PCT No.: PCT/KR2019/009553
§ 371 (c)(1),
(2) Date: Jul. 17, 2020

(87) PCT Pub. No.: WO2020/096169
PCT Pub. Date: May 14, 2020

(65) Prior Publication Data
US 2021/0125470 A1 Apr. 29, 2021

(30) Foreign Application Priority Data
Nov. 8, 2018 (KR) ......................... 10-2018-0136912

(51) Int. Cl.
*G08B 13/00* (2006.01)
*G05D 1/00* (2006.01)

(52) U.S. Cl.
CPC ........... *G08B 13/00* (2013.01); *G05D 1/0016* (2013.01); *G05D 1/0022* (2013.01)

(58) Field of Classification Search
None
See application file for complete search history.

(56) References Cited

U.S. PATENT DOCUMENTS

| 2013/0056032 A1 | 3/2013 | Choe et al. |
| 2015/0205301 A1* | 7/2015 | Gilmore ................... G05D 1/12 701/11 |
| 2018/0357877 A1* | 12/2018 | Reeder .................. H04W 12/33 |

FOREIGN PATENT DOCUMENTS

| JP | 9-330484 A | 12/1997 |
| KR | 10-2013-0027339 A | 3/2013 |

(Continued)

*Primary Examiner* — Thomas S McCormack
(74) *Attorney, Agent, or Firm* — Birch, Stewart, Kolasch & Birch, LLP (57) ABSTRACT

An antitheft system of a user terminal module and a mobile robot capable of being used as a shopping cart are disclosed. The antitheft system includes: a user terminal module generating terminal location data comprising location coordinates; a mobile robot assisting in driving through conversion of a drive mode into a preset drive mode depending upon a location of the user terminal module and a distance from the mobile robot to the user terminal module while generating and outputting robot location data comprising location data thereof in real time; and a monitoring device monitoring locations of the user terminal module and the mobile robot in real time and controlling the terminal module and the mobile robot to perform an antitheft operation depending upon a region in which the terminal module and the mobile robot are placed, thereby improving reliability by preventing theft and loss of the user terminal module and the mobile robot.

17 Claims, 7 Drawing Sheets

(56) References Cited

FOREIGN PATENT DOCUMENTS

| KR | 10-2016-0057647 A | 5/2016 |
| KR | 10-2017-0089074 A | 8/2017 |
| KR | 10-2018-0026963 A | 3/2018 |
| KR | 10-2018-0064691 A | 6/2018 |
| WO | WO 2018/044015 A1 | 3/2018 |

* cited by examiner

ANTITHEFT SYSTEM OF MOBILE ROBOT

CROSS-REFERENCE TO RELATED APPLICATIONS

This application is the National Phase of PCT International Application No. PCT/KR2019/009553, filed on Jul. 31, 2019, which claims priority under 35 U.S.C. 119(a) to Korean Patent Application No. 10-2018-0136912, filed in the Republic of Korea on Nov. 8, 2018, all of these applications are hereby expressly incorporated by reference into the present application.

TECHNICAL FIELD

The present disclosure relates to an antitheft system of a user terminal module and a mobile robot capable of being used as a shopping cart.

BACKGROUND ART

As a part of factory automation, robots have been developed for industrial use. In recent years, application of robots has been further expanded to develop robots that can be used in daily life, as well as medical robots and aerospace robots.

Recently, there is a need for robots that can provide various services. Such robots for daily life provide specific services, for example, shopping, transporting, serving, talking, cleaning, and the like, in response to a user command.

By way of example, Korean Patent Laid-open Publication No. 2010-98056 discloses a cart robot driving system. The cart robot is moved by pushing or dragging with a user hand, and generally includes a basket adapted to receive goods therein, a liftable plate disposed on an inner bottom of the basket to allow the goods to be placed thereon, and a lifting unit lifting or lowering the plate to lift or lower the goods placed on the plate inside the basket.

As disclosed in the above publication, typical robots for daily life are developed to provide specific services. However, despite the structure of the robots adapted to perform only limited functions, such robots have a problem of low utilization, considering costs for development of the robots.

Moreover, since theft or loss of cart robots developed and commercialized through extensive investment causes significant damage to developers or owners of the robots, it is necessary to exert a great deal of effort to prevent theft or loss of the cart robots. Therefore, there is a need for construction of a system for preventing theft or loss of the cart robots corresponding to environments or situations in which the cart robots are used.

DISCLOSURE

Technical Problem

Embodiments of the present disclosure provide an antitheft system capable of preventing theft and loss of a user terminal module or a mobile robot capable of being used as a shopping cart by assisting in driving of the mobile robot upon driving in a user tracking mode along a user movement course or upon manual driving of a user.

Embodiments of the present disclosure provide an antitheft system that automatically detects a distance between a user carrying a user terminal module and a mobile robot in real time and allows the user terminal module and the mobile robot to operate simultaneously in an antitheft mode based on a detection result.

Embodiments of the present disclosure provide an antitheft system that monitors location data of a user terminal module and a mobile robot in real time through a monitoring device and may control the user terminal module and the mobile robot to perform an antitheft operation depending upon regions in which the terminal module and the mobile robot are placed.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solution

In accordance with one embodiment of the present disclosure, a mobile robot assists in driving through conversion of a drive mode into a user tracking mode, a standby mode or a drive power support mode depending upon a location of a user terminal module and a distance from the mobile robot to the user terminal module, and operates in an antitheft mode when the distance from the mobile robot to the user terminal module exceeds a preset antitheft reference.

The user terminal module may also receive robot location data including location coordinates of the mobile robot previously paired therewith, calculate a distance from the user terminal module to the mobile robot in real time through comparison of the location coordinates of the user terminal module with the location coordinates of the mobile robot, and operate in the antitheft mode when the distance from the user terminal module to the mobile robot exceeds a preset antitheft reference.

The monitoring device may monitor the locations of the user terminal module and the mobile robot in real time and may control the user terminal module and the mobile robot to perform an antitheft operation depending upon a region in which the user terminal module and the mobile robot are placed. That is, the monitoring device sends a warning message setting signal upon determination that the user terminal module or the mobile robot is placed in at least one warning region, and sends an antitheft mode setting signal upon determination that the user terminal module or the mobile robot is placed in a theft risk region.

Accordingly, the user terminal module may control an alarm operation of an alarm unit in response to the warning message setting signal sent from the monitoring device such that a preset loss and departure guide message is displayed through at least one alarm device in the alarm unit. In addition, in response to the antitheft mode setting signal, the user terminal module operates in an antitheft mode and controls the alarm operation of the alarm unit such that a preset antitheft warning message is displayed through at least one alarm device in the alarm unit.

Likewise, in the course of assisting in driving in one mode selected from among the user tracking mode, the standby mode and the drive power support mode, the mobile robot controls an alarm operation of an interface module in response to the warning message setting signal from the monitoring device such that a preset loss and departure guide message is displayed through at least one alarm device in the interface module. Further, in response to the antitheft mode setting signal, the mobile robot operates in an antitheft mode and controls the alarm operation of the interface module such that a preset antitheft warning message is displayed through at least one alarm device in the interface module.

Advantageous Effects

According to embodiments of the present disclosure, the antitheft system prevents terminal modules carried by a user and mobile robots capable of being used as shopping carts from being stolen and lost, thereby improving reliability thereof.

In addition, the antitheft system can automatically detect the distance between a user carrying a terminal module and the mobile robot in real time to allow the terminal module and the mobile robot to operate simultaneously in an antitheft mode, thereby further improving user convenience and satisfaction.

Further, the monitoring device of the antitheft system monitors the locations of the user terminal modules and the mobile robots in real time and allows the terminal modules and the mobile robots to perform an antitheft operation depending upon a region in which the terminal modules and the mobile robots are placed, thereby further improving efficiency in management of the terminal modules and the mobile robots.

Further, the mobile robot allows not only a basket but also other loading boxes or luggage packaging members to be detachably mounted thereon while providing a function as a shopping cart, thereby further improving utilization of various types of mobile robots requiring a tracking type cart.

Further, the mobile robot may be driven in one mode selected from among a user tracking mode, a standby mode and a drive power support mode using an inexpensive sensor, such as a UWB (ultra-wide band) ToF sensor, a Lidar sensor, and the like, thereby reducing manufacturing costs of the mobile robot.

BEST MODE

The above and other aspects, features, and advantages of the present disclosure will be described in more detail in conjunction with the accompanying drawings so as to fully convey the spirit of the present disclosure to those skilled in the art. Descriptions of known functions and constructions which can unnecessarily obscure the subject matter of the present disclosure will be omitted. Hereinafter, embodiments of the present disclosure will be described in detail with reference to the accompanying drawings. Like components will be denoted by like reference numerals throughout the accompanying drawings.

Hereinafter, exemplary embodiments of the present disclosure will be described with reference to the accompanying drawings.

Figure 1:
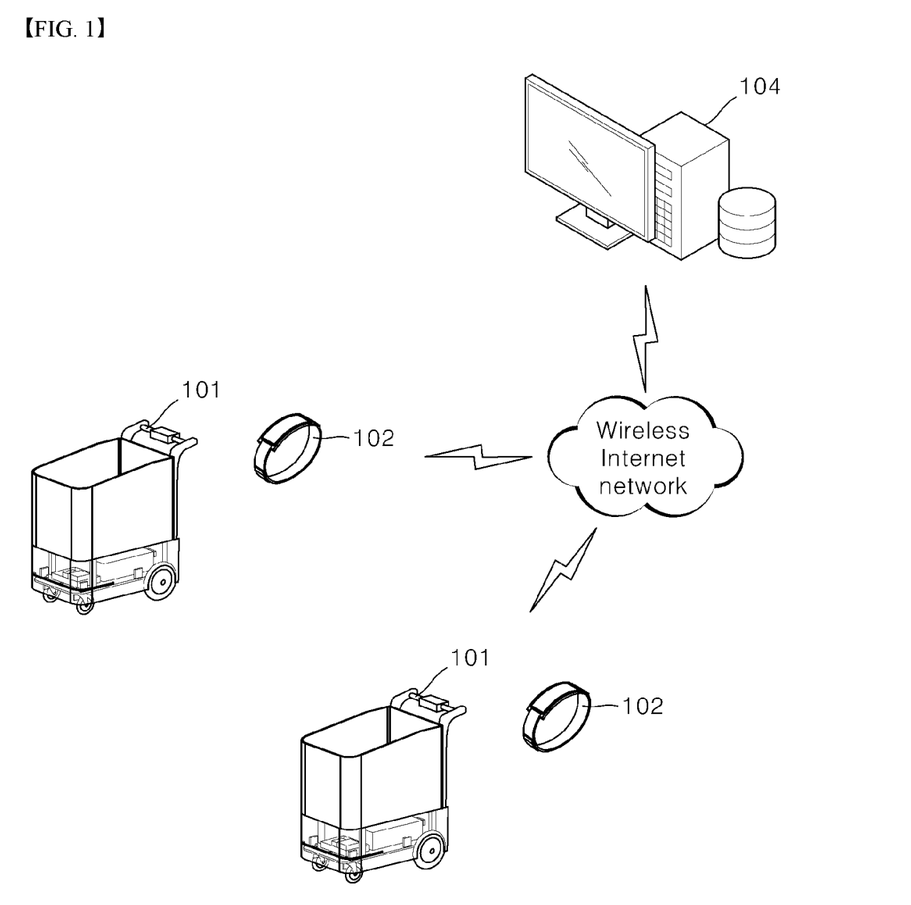
FIG. 1 is a diagram of an antitheft system of a mobile robot according to embodiments of the present disclosure.

FIG. 1 is a diagram of an antitheft system of a mobile robot according to embodiments of the present disclosure.

According to the present disclosure, a mobile robot may be used not only as a shopping cart, but also as various types of mobile robots requiring tracking, such as logistics carts.

Referring to FIG. 1, the antitheft system according to the embodiments of the present disclosure includes at least one user terminal module 102, at least one mobile robot 101 paired with at least one user terminal module 102 and tracking the paired user terminal module 102, and a monitoring device 104.

The user terminal module 102 generates terminal location data including an identification code and location coordinates thereof in real time using a GPS communication module or a near-field communication module, and sends the terminal location data to the at least one mobile robot 101 paired therewith and the monitoring device 104.

Specifically, the user terminal module 102 may generate the location coordinates thereof in response to a GPS signal received through the GPS communication module, or through near-field wireless communication with a near-field wireless communication module, such as a plurality of beacons or Wi-Fi, near the user terminal module. In addition, the user terminal module 102 may share the terminal location data including the identification code and the location coordinates thereof with the at least one mobile robot 101 paired therewith and the monitoring device 104 in real time.

In particular, the user terminal module 102 receives robot location data including location coordinates of the mobile robot 101 paired therewith and monitors the distance from the user terminal module 102 to the mobile robot 101 corresponding to the received location coordinates in real time. Further, upon determination that the distance from the user terminal module 102 to the mobile robot 101 exceeds a preset antitheft reference, the user terminal module 102 operates in an antitheft mode.

Each of the mobile robots 101 detects the distance and orientation data with respect to the user terminal module 102 previously paired therewith and generates robot location data including an identification code and location coordinates thereof in real time. The mobile robot 101 sends the robot location data generated and changed in real time to the user terminal module 102 paired therewith and the monitoring device 104, and assists in driving of the mobile robot by setting one mode selected from among a user tracking mode, a standby mode and a drive power support mode depending upon the location of the user terminal module 102 and a distance from the robot to the user terminal module 102.

In the course of operating in one mode selected from among the user tracking mode, the standby mode and the drive power support mode, the mobile robot 101 operates in the antitheft mode upon determination that the distance from the mobile robot 101 to the user terminal module 102 exceeds a preset antitheft reference. Details and technical features of the user terminal module 102 and the mobile robot 101 will be described below with reference to the accompanying drawings.

The monitoring device 104 receives the terminal location data from at least one user terminal module 102 and the robot location data from at least one mobile robot 101 in real time. The monitoring device 104 monitors the locations of the at least one user terminal module 102 and the mobile robot 101 in real time and performs antitheft operation with respect to the user terminal module 102 and the mobile robot 101 depending upon a region in which the at least one user terminal module 102 and the mobile robot 101 are placed.

Figure 2:
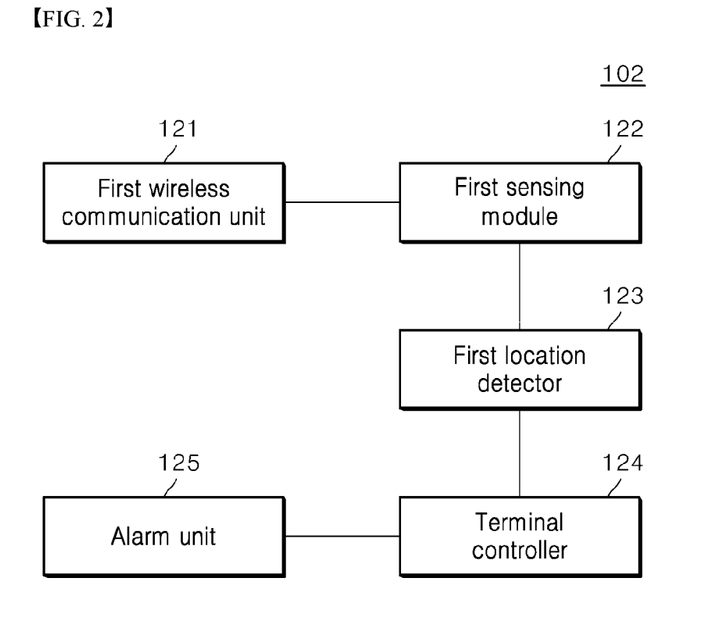
FIG. 2 is a block diagram of one user terminal module shown in FIG. 1.

FIG. 2 is a block diagram of the user terminal module shown in FIG. 1.

Referring to FIG. 2, the user terminal module 102 includes a first wireless communication unit 121, a first sensing module 122, a first location detector 123, a terminal controller 124, and an alarm unit 125.

Specifically, the first sensing module 122 generates location coordinates thereof in response to a GPS signal received through the GPS communication module, or through near-field wireless communication with a near-field wireless communication module, such as a plurality of beacons or Wi-Fi, near the user terminal module 102.

The first location detector 123 generates terminal location data including a preset identification code and the location coordinates generated by the first sensing module 122. The first sensing module 122 and the first location detector 123 may include processor units, such as microcontrollers and the like.

The first wireless communication unit 121 is provided with a remote communication module to perform wireless Internet communication with the mobile robot 101 and the monitoring device 104. The first wireless communication unit 121 sends the terminal location data to the mobile robot 101 and the monitoring device 104 and receives the robot location data from the previously paired mobile robot 101.

The terminal controller 124 is a central processor unit and calculates the distance from the user terminal module to the mobile robot 101 in real time through comparison of the location coordinates included in the terminal location data with the location coordinates of the previously paired mobile robot 101. In addition, the terminal controller 124 operates in the antitheft mode and controls an alarm operation of the alarm unit 125 when the distance from the user terminal module to the mobile robot 101 exceeds a preset antitheft reference.

Further, the terminal controller 124 may operate in the antitheft mode and control the alarm operation of the alarm unit 125 in response to an antitheft setting signal sent from the monitoring device 104 through the first wireless communication unit 121.

The alarm unit 125 may include at least one alarm device selected from among an image display panel, a speaker and a lighting apparatus, and performs a theft and loss alarm operation through the at least one alarm device under control of the terminal controller 124. In the theft and loss alarm operation, a preset loss and departure guide message, an antitheft warning message, or the like is displayed in the form of sound, image and lighting through the at least one alarm device.

Figure 3:
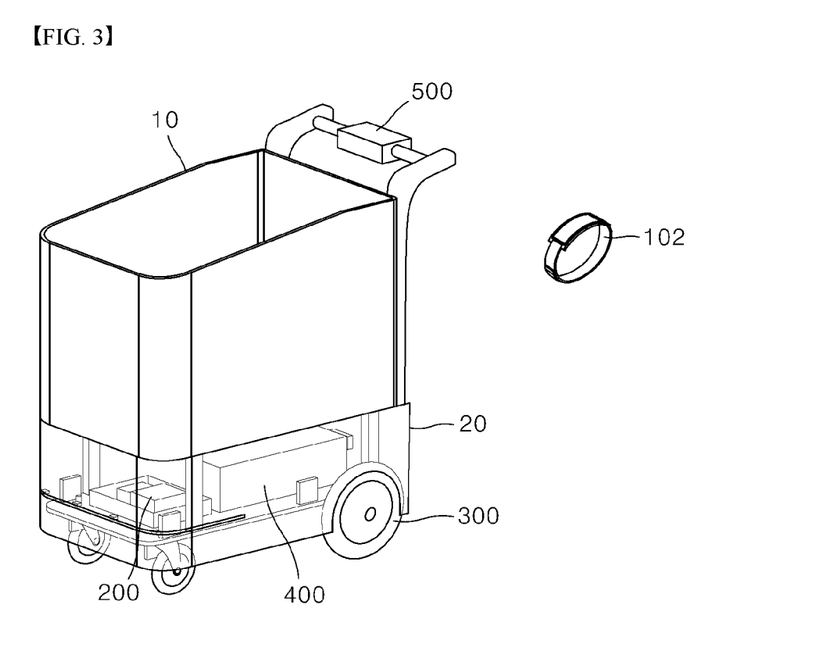
FIG. 3 is a perspective view of a mobile robot capable of being used as a shopping cart shown in FIG. 1.
Figure 4:
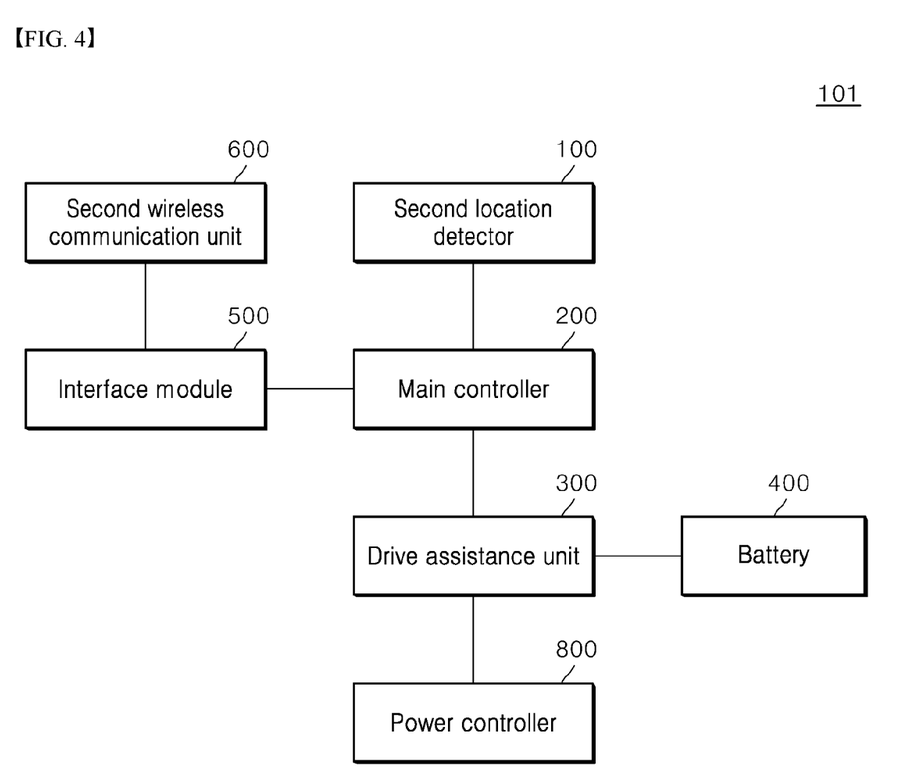
FIG. 4 is a block diagram of the mobile robot of FIG. 3.
Figure 5:
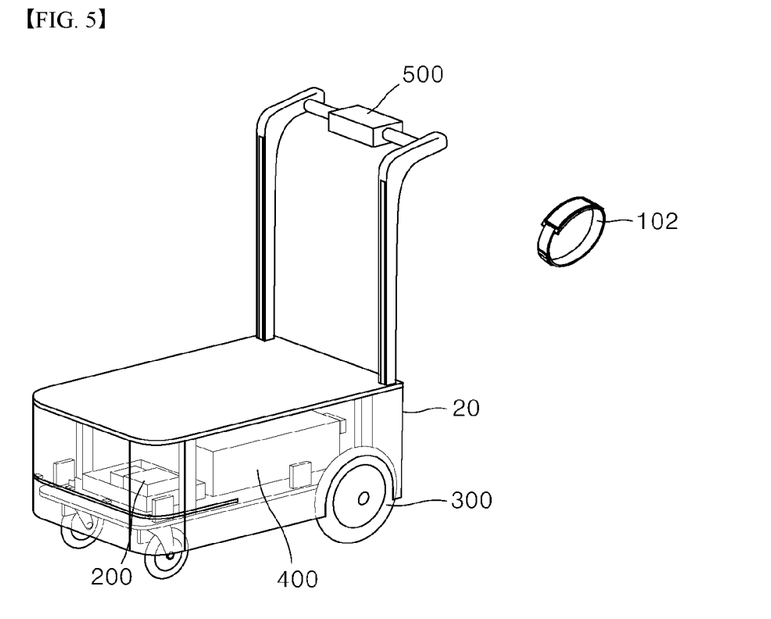
FIG. 5 is a perspective view of the mobile robot of FIG. 3, with a basket module separated therefrom.

FIG. 3 is a perspective view of a mobile robot capable of being used as a shopping cart shown in FIG. 1. FIG. 4 is a block diagram of the mobile robot of FIG. 3. FIG. 5 is a perspective view of the mobile robot of FIG. 3, with a basket module separated therefrom.

Referring to FIG. 3 to FIG. 5, the mobile robot 101 includes a frame module 20 constituting a main body; a drive assistance unit 300 supplying power to a wheel of the frame module 20; a second location detector 100 detecting a location of the user terminal module 102; a second wireless communication unit 600 performing wireless communication; a main controller 200 assisting in driving of the mobile robot through setting and conversion of a drive mode while performing an antitheft control operation; a battery 400 supplying power to the drive assistance unit 300 and the like; and a power controller 800.

The basket module 10 may be coupled to an upper portion or a front side of the frame module 20 and a hand frame is provided to a rear side of the frame module 20 to assist a user to control a drive direction of the mobile robot.

The hand frame of the frame module 20 may be further provided with a manual driving detector which is a component of the drive assistance unit 300. In addition, the hand frame may be provided with an interface unit 500, which displays a detection result of the location detector 100 detecting the location of the terminal module 102, drive mode setting and change of the main controller 200, a charged state of the battery 400, a drive state of the drive assistance unit 300, and the like.

The drive assistance unit 300 supplies power to at least one drive wheel motor of the frame module 20 to control drive force of the drive wheel motor. The drive assistance unit 300 supplies power to at least one drive wheel motor under control of the main controller 200 upon setting a user tracking mode of the main controller 200.

On the other hand, upon setting a user tracking drive power assistance mode of the main controller 200, the drive assistance unit 300 senses pushing force applied to the manual driving detector by a user. Then, the drive assistance unit 300 supplies power to at least one drive wheel motor of the frame module 20 so as to correspond to the sensed pushing force.

The second location detector 100 is mounted on the frame module 20 or the drive assistance unit 300 to detect the location and orientation of the user terminal module 102, the distance from the mobile robot 101 to the user terminal module 102, and the like. Specifically, the location detector 100 may generate location coordinate data of the user terminal module 102 depending upon the distance and orientation data with respect to the user terminal module 102. The second location detector 100 sends detection results on the distance from the mobile robot 101 to the user terminal module 102 and the orientation of the user terminal module 102 to the main controller 200.

In addition, the second location detector 100 detects location coordinates thereof in response to a GPS signal received through a GPS communication module, and generates robot location data including an identification code and the location coordinates thereof. Then, the second location detector 100 sends the robot location data to the previously paired user terminal module 102 and the monitoring device 104 through the second wireless communication unit 600.

The main controller 200 may control the drive assistance unit 300 in the user tracking mode, the drive power assistance mode or the standby mode set by a user through the interface module 500.

Here, the main controller 200 may automatically control the drive assistance unit 300 by setting the user tracking mode according to the distance and orientation data with respect to the terminal module 102 detected by the second location detector 100, or may assist in manual driving of the drive assistance unit 300 by converting the drive mode into the drive power assistance mode depending upon whether the manual driving detector detects a user.

Specifically, the main controller 200 determines whether the terminal module 102 is placed in a preset neutral zone depending upon the distance and orientation data with respect to the user terminal module 102 detected by the second location detector 100. Upon determination that the user terminal module 102 is placed outside the preset neutral zone, the main controller 200 automatically controls the drive assistance unit 300 by setting the mobile robot 101 to drive in the user tracking mode.

In the user tracking mode, the main controller 200 compares the location coordinate data of the terminal module 102 sent from the location detector 100 with the coordinate data of the location detector 100. Then, the main controller 200 monitors the location coordinate data of the user terminal module 102 in real time and generates movement course data of the terminal module 102 depending upon variation in location coordinates of the terminal module 102. Then, the main controller 200 sets drive coordinates and drive courses in real time through comparison of the movement course data of the terminal module 102 with current location coordinate data of the location detector 100. Then, the main controller 200 controls the drive assistance unit 300 such that the mobile robot drives along the set drive coordinates and the drive course while maintaining a preset distance with respect to the terminal module 102.

Upon determination that the user terminal module 102 is placed in the neutral zone, the main controller 200 may convert the drive mode into the standby mode. In addition, when the manual driving detector senses user touch in the neutral zone, the main controller 200 converts the drive mode into the drive power assistance mode to assist in manual driving of the drive assistance unit 300. In the drive power assistance mode, the main controller 200 controls the drive assistance unit 300 to sense pushing force applied to the manual driving detector by a user and to assist in power supply to the drive wheel motor of the frame module 20.

In addition, the main controller 200 may automatically set or convert the drive mode into one mode selected from among the user tracking mode, the standby mode and the drive power assistance mode based on the orientation data with respect to the user terminal module 102 detected by the location detector 100. In other words, when the user terminal module 102 is moved outside the neutral zone in a front direction of the location detector 100, the main controller 200 may convert the drive mode into the user tracking mode and automatically control the drive assistance unit 300. Conversely, when the user terminal module 102 is detected in a lateral direction of the location detector 100, the main controller 200 may set or convert the drive mode into the standby mode. In addition, when the user terminal module 102 is moved into the neutral zone in a rear direction of the location detector 100, the main controller may set or convert the drive mode into the drive power assistance mode to assist in manual driving of the drive assistance unit 300.

In the course of assisting in driving in one mode selected from among the user tracking mode, the standby mode, and the drive power assistance mode, the main controller 200 compares the distance data with respect to the user terminal module 102 detected by the second location detector 100 with a preset antitheft reference in real time, and operates in the antitheft mode to control an alarm operation of the interface module 500 upon determination that the distance from the mobile robot to the user terminal module 102 exceeds the preset antitheft reference.

In addition, in the course of assisting in driving in one mode selected from among the user tracking mode, the standby mode, and the drive power assistance mode, the main controller 200 operates in the drive power assistance mode to control the alarm operation of the interface module 500 in response to an antitheft mode setting signal sent from the monitoring device 104 through the second wireless communication unit 600.

The interface module 500 includes at least one alarm device selected from among an image display panel, a speaker and a lighting apparatus, and performs a theft and loss alarm operation through the at least one alarm device under control of the terminal controller 124. Upon operation in the antitheft mode, a preset loss and departure guide message, an antitheft warning message, or the like is displayed in the form of sound, image and lighting through the at least one alarm device.

The battery 400 supplies drive power to the drive assistance unit 300, the second location detector 100, and the main controller 200 in real time.

Upon operation of the main controller 200 in the antitheft mode, the power controller 800 blocks power supply from the battery 400 to the drive assistance unit 300 under control of the main controller 200.

Specifically, upon operation in the antitheft mode, the main controller 200 sends a control signal for blocking power of the drive assistance unit 300 to the power controller 800. Then, the power controller 800 controls a current breaker therein according to the power blocking control signal to block power supply from the battery 400 to the drive assistance unit 300. When power supply to the drive assistance unit 300 is blocked, the drive wheel motor of the drive assistance unit 300 is stopped and is set to maintain an automatic break state, whereby driving and movement of the mobile robot 101 can be restricted.

Figure 6:
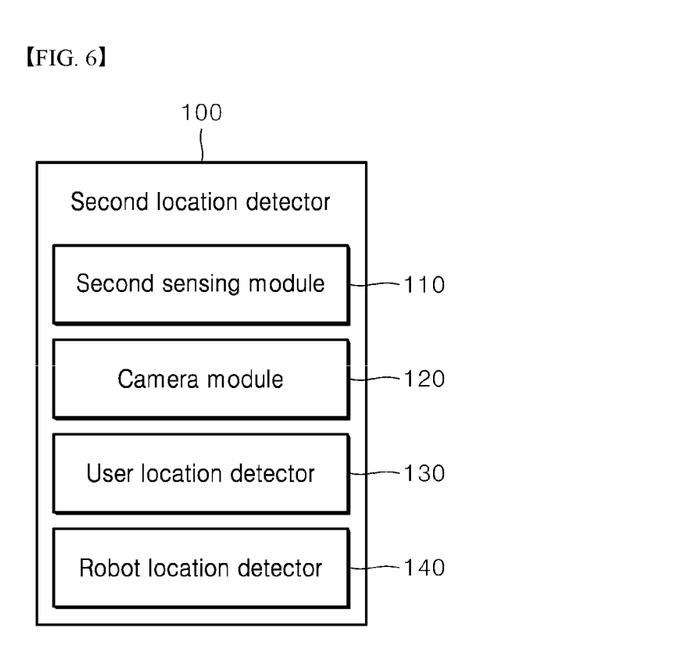
FIG. 6 is a block diagram of a second location detector shown in FIG. 3 to FIG. 5.

FIG. 6 is a block diagram of the second location detector shown in FIG. 3 to FIG. 5.

Referring to FIG. 6, the second location detector 100 includes a second sensing module 110, a camera module 120, a user location detector 130, and a robot location detector 140.

Specifically, the second sensing module 110 detects distance and orientation data with respect to the user terminal module 102 through recognition of the user terminal module 102. To this end, the second sensing module 110 may include at least one UWB (ultra-wide band) sensor (for example, a ToF sensor and Lidar), a microcontroller adapted to convert a sensing signal into a digital signal and to generate orientation data, a wired/wireless communication module, and the like.

The camera module 120 photographs the user terminal module 102 to detect the orientation data with respect to the terminal module 102. The camera module 120 photographs the terminal module 102 using an image sensor, such as a charge-coupled device (CCD), to detect the orientation data of the terminal module 102 based on results of comparison of locations and orientations of the terminal module 102 and the camera module 120.

The user location detector 130 receives the distance and orientation data with respect to the user terminal module 102 and generates location coordinate data of the user terminal module 102. Further, the user location detector 130 generates location coordinate comparison data of the user terminal module 102 with reference to reference coordinates of the location detector 100 by comparing reference coordinate data of the location detector 100 supplied from the robot location detector 140 with the location coordinate data of the user terminal module 102. Here, the robot location detector 140 detects a current location thereof and generates location coordinate data thereof as reference coordinate data based on the detection results of the distance and orientation with respect to the user terminal module 102.

Further, the robot location detector 140 detects the location coordinates thereof in response to a GPS signal received through a GPS communication module and generates robot location data including an identification code and the location coordinates thereof. The robot location data is sent to the previously paired user terminal module 102 and the monitoring device 104 through the second wireless communication unit 600.

Figure 7:
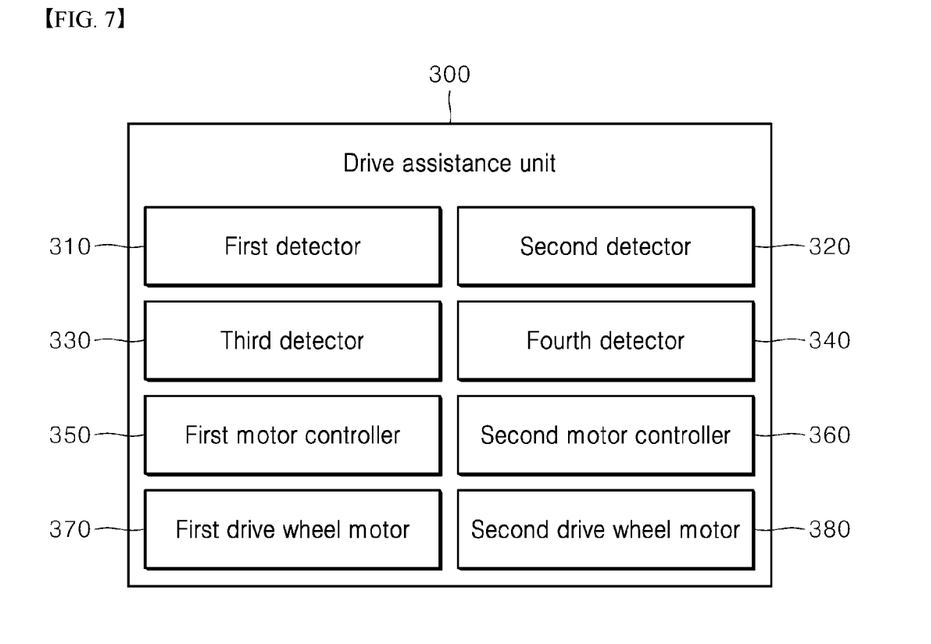
FIG. 7 is a block diagram of a drive assistance unit shown in FIG. 3 to FIG. 5.

FIG. 7 is a block diagram of a drive assistance unit shown in FIG. 3 to FIG. 5.

Referring to FIG. 7, the drive assistance unit 300 includes a plurality of manual driving detectors 310 to 340, first and second drive wheel motors 370, 380, and first and second motor controllers 350, 360.

The manual driving detectors 310 to 340 detect user touch and pushing force applied thereto, and generate front/rear detection signals corresponding to the detected pushing force. For example, a right-side hand frame is provided with first and second detectors 310, 320 in front and rear directions thereof to be used as user grippers. Here, the first detector 310 detects rearward pushing force applied by a user and the second detector 320 detects forward pushing force applied by the user.

A left-side hand frame is provided with third and fourth detectors 330, 340 in the front and rear directions thereof to be used as user grippers. The third detector 330 and the fourth detector 340 detect rearward and forward pushing force applied by a user, respectively. With the gripper-shaped configuration, the first to fourth detectors 310 to 340 detect the forward/rearward user touch and pushing force applied by the user, and generate the front/rear detection signals corresponding to the detected pushing force.

Each of the first and second drive wheel motors 370, 380 includes at least one electric motor and a power transmission shaft to supply drive force to each of wheel shafts of the frame module 20.

When the main controller 200 sets the drive power assistance mode, the first and second motor controllers 350, 360 may control the drive force of each of the first and second drive wheel motors 370, 380 so as to correspond to the forward/rearward user touch and pushing force detected by the first to fourth detectors 310 to 340.

In addition, when the main controller 200 sets the user tracking mode, the first and second motor controllers 350, 360 may control the drive force of each of the first and second drive wheel motors 370, 380 in response to a control signal from the main controller 200.

Figure 8:
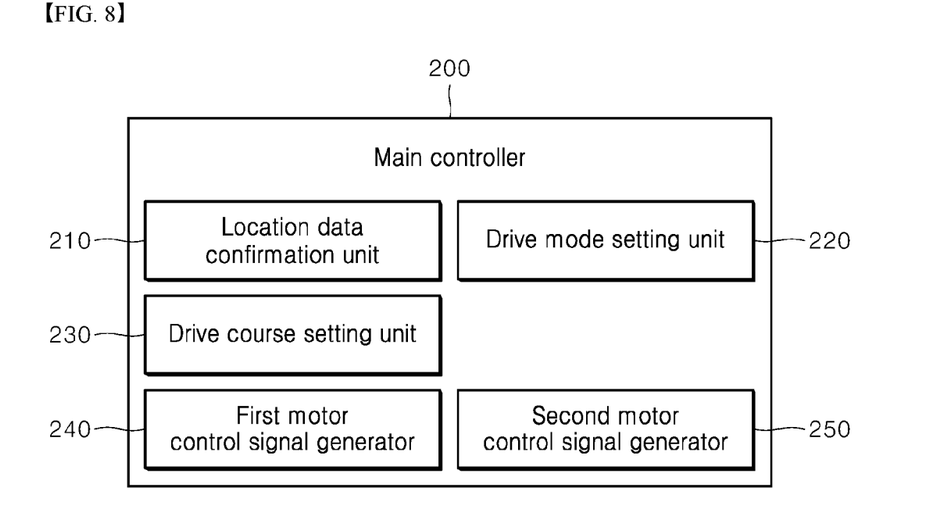
FIG. 8 is a block diagram of a main controller shown in FIG. 3 to FIG. 5.

FIG. 8 is a block diagram of the main controller shown in FIG. 3 to FIG. 5.

Referring to FIG. 8, the main controller 200 may include at least one selected from among a location data confirmation unit 210, a drive mode setting unit 220, a drive course setting unit 230, and a plurality of motor control signal generators 240, 250. With these components, the main controller 200 may control the drive assistance unit 300 corresponding to the user tracking mode or the drive power assistance mode set by a user and displayed on the interface module 500.

Specifically, the location data confirmation unit 210 of the main controller 200 receives the location coordinate data of the user terminal module 102 and the coordinate data of the location detector 100 through the location detector 100 in real time. Then, the location data confirmation unit 210 generates the movement course data of the user terminal module 102 through comparison of the location coordinate data of the user terminal module 102 with the coordinate data of the location detector 100.

Then, based on a comparison result between the location coordinate data of the user terminal module 102 and the coordinate data of the location detector 100, the drive mode setting unit 220 may automatically set or convert the drive mode into one mode selected from among the user tracking mode, the standby mode, and the drive power assistance mode. In addition, the drive mode setting unit 220 sends a mode conversion signal to the drive assistance unit 300.

Furthermore, in the course of assisting in driving in one mode selected from among the user tracking mode, the standby mode, and the drive power assistance mode, the drive mode setting unit 220 compares the distance data with respect to the user terminal module 102 with a preset antitheft reference in real time. Further, upon determination that the distance from the mobile robot to the user terminal module 102 exceeds the preset antitheft reference, the drive mode setting unit 220 sets the antitheft mode and controls the alarm operation of the interface module 500 corresponding thereto. Technical features of the drive mode setting unit 220 in mode setting and conversion will be described in more detail with reference to the accompanying drawings.

When the user tracking mode is set by the drive mode setting unit 220, the drive course setting unit 230 compares the movement course data of the terminal module 102 with current location coordinate data of the location detector 100. Then, the drive course setting unit 230 sets drive coordinates and a drive course in real time based on a comparison result.

The plurality of motor control signal generators 240, 250 includes first and second motor control signal generators 240, 250. Each of the first and second motor control signal generators 240, 250 controls first and second motor controllers 350, 360 of the drive assistance unit 300 such that the mobile robot drives along the drive coordinates and the drive course set by the drive course setting unit 230 while maintaining a preset distance with respect to the user terminal module 102.

Figure 9:
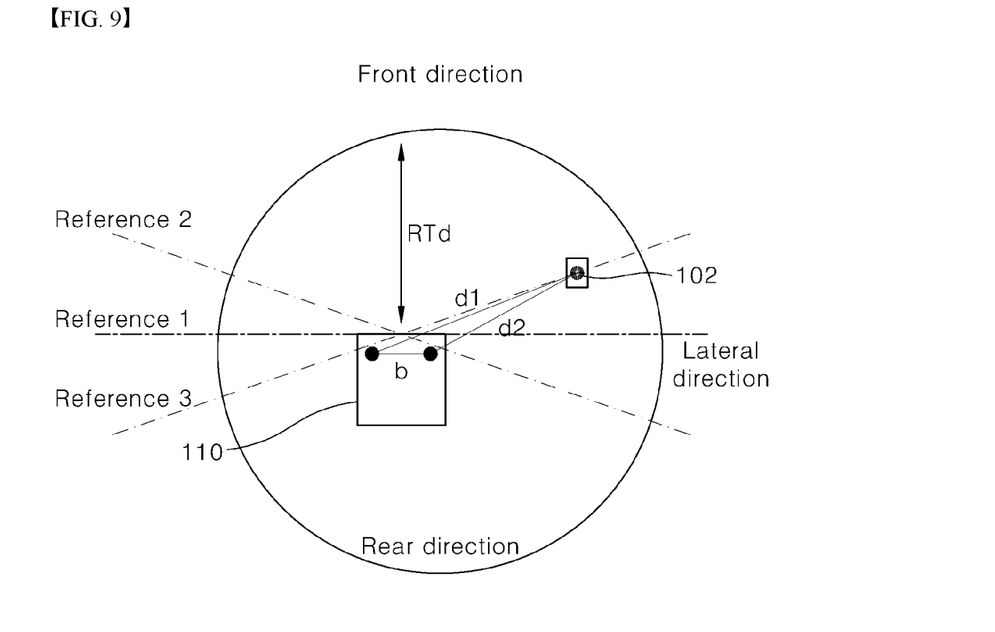
FIG. 9 is a diagram illustrating a user location data confirmation method performed by a location data confirmation unit shown in FIG. 8.

FIG. 9 is a diagram illustrating a user location data confirmation method performed by the location data confirmation unit shown in FIG. 8. In addition, FIG. 10 is a diagram illustrating a method of detecting and confirming a distance between user terminal modules performed by the location data confirmation unit shown in FIG. 8.

Figure 10:
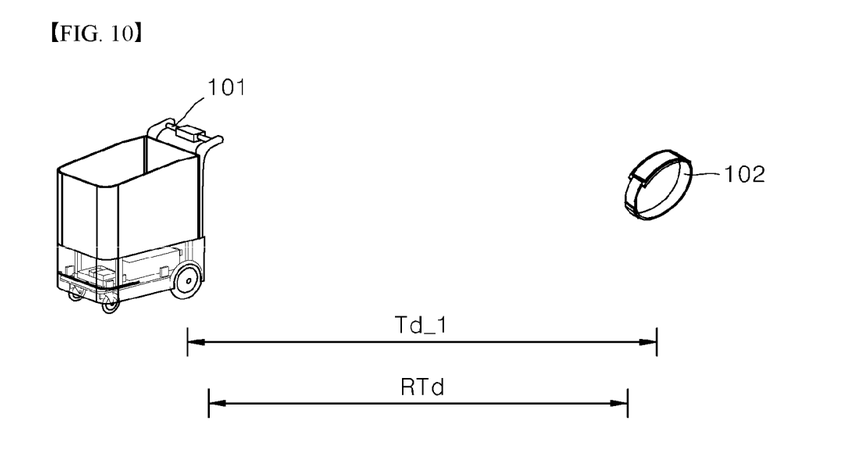
FIG. 10 is a diagram illustrating a method of detecting and confirming a distance between user terminal modules performed by the location data confirmation unit shown in FIG. 8.

Referring to FIG. 9 and FIG. 10, the drive mode setting unit 220 of the main controller 200 determines, based on the comparison result between the location coordinate data of the user terminal module 102 and the coordinate data of the location detector 100, whether the user terminal module 102 is placed in or outside a preset neutral zone RTd and is farther apart from an antitheft reference Td_1. Upon determination that the user terminal module 102 is placed within the antitheft reference Td_1 outside the neutral zone RTd, the drive mode setting unit 220 converts the current drive mode into the user tracking mode and automatically controls the drive assistance unit 300.

Further, upon determination that the user terminal module 102 is placed in the neutral zone RTd, the drive mode setting unit 220 of the main controller 200 converts the current drive mode into the standby mode. Then, when the manual driving detector detects user touch within the neutral zone RTd, the drive mode setting unit 220 may convert the current drive mode into the drive power assistance mode to allow the drive assistance unit 300 to assist in manual driving.

Furthermore, in the drive power assistance mode, the main controller 200 may control the drive assistance unit 300 to supply power to the drive wheel motor of the frame module 20 based on detection of the pushing force applied to the manual driving detectors by a user.

The drive mode setting unit 220 of the main controller 200 determines whether the user terminal module 102 is placed in any one range among a plurality of preset reference ranges (References 1 to 3), based on the comparison result between the location coordinate data of the user terminal module 102 and the coordinate data of the location detector 100. In addition, based on the confirmation result, the location detector 100 detects the current location data of the user terminal module 102 by determining that the terminal module 102 is placed in the front direction, the lateral direction, or the rear direction.

Upon determination that the terminal module 102 is moved outside the neutral zone in the front direction of the location detector 100, the drive mode setting unit 220 may convert the drive mode into the user tracking mode to automatically control the drive assistance unit 300.

On the other hand, upon determination that the terminal module 102 is detected in the neutral zone in the lateral direction of the location detector 100, the drive mode setting unit 220 may convert the drive mode into the standby mode. In addition, upon determination that the terminal module 102 is moved into the neutral zone in the rear direction of the location detector 100, the drive mode setting unit 220 may convert the drive mode into the drive power assistance mode to allow the drive assistance unit 300 to assist in manual driving.

On the other hand, upon determination that the user terminal module 102 is farther apart from the antitheft reference Td_1, the drive mode setting unit 220 of the main controller 200 converts the drive mode into the antitheft mode to control the alarm operation of the interface module 500. Furthermore, the drive mode setting unit 220 sends the control signal for blocking power of the drive assistance unit 300 to the power controller 800.

Figure 11:
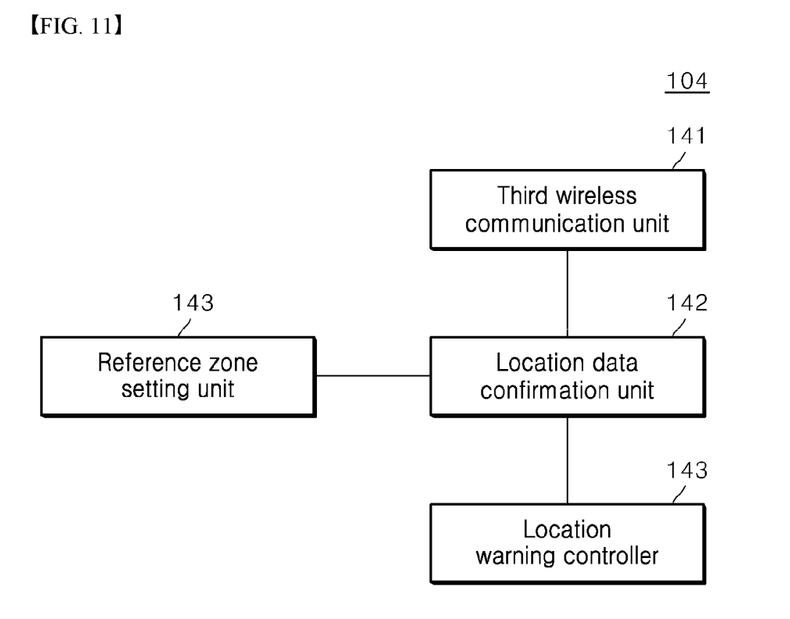
FIG. 11 is a block diagram of a monitoring device shown in FIG. 1.
Figure 12:
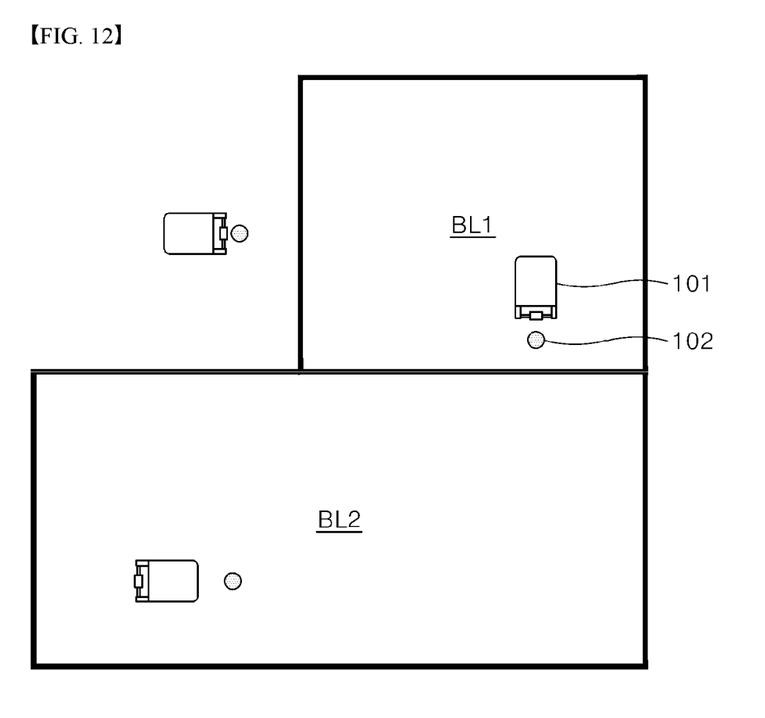
FIG. 12 is a diagram illustrating a function of performing an antitheft operation of the monitoring device shown in FIG. 1 and FIG. 11.

FIG. 11 is a block diagram of the monitoring device shown in FIG. 1. FIG. 12 is a diagram illustrating a function of performing an antitheft operation of the monitoring device shown in FIG. 1 and FIG. 11.

First, referring to FIG. 11, the monitoring device 104 includes a third wireless communication unit 141, a reference zone setting unit 143, a location data confirmation unit 142, and a location warning controller 143.

Specifically, the third wireless communication unit 141 receives terminal location data of the user terminal module 102 and robot location data of the mobile robot 101 in real time. When a warning message setting signal or an antitheft setting signal is generated from the location warning controller 143, the third wireless communication unit 141 sends the warning message setting signal or the antitheft setting signal to the user terminal module 102 or the mobile robot 101.

Referring to FIG. 12, the reference zone setting unit 143 classifies regions, in which the user terminal module 102 and the mobile robot 101 are placed, into at least one activity region BL2, at least one warning region BL1, and a theft risk region, and sets location coordinates of boundaries between the regions. Here, the theft risk region may be a remaining region excluding the at least one activity region BL2 and the at least one warning region BL1. The location coordinates of the boundaries between the at least one activity region BL2, the at least one warning region BL1, and the theft risk region are shared with the location data confirmation unit 142.

The location data confirmation unit 142 displays comparison results through a monitor by comparing the location coordinates included in the terminal location data of the user terminal module 102 and the location coordinates included in the robot location data of the mobile robot 101 with the locations coordinates defining the at least one activity region BL2, the at least one warning region BL1, and the theft risk region in real time. Then, a manager can confirm the location of the user terminal module 102 or the mobile robot 101 in the at least one activity region BL2, the at least one warning region BL1, and the theft risk region in real time.

The location warning controller 143 compares the location coordinates included in the terminal location data of the user terminal module 102 and the location coordinates included in the robot location data of the mobile robot 101 with the location coordinates defining the at least one activity region BL2, the at least one warning region BL1, and the theft risk region in real time. Then, upon determination that the user terminal module 102 or the mobile robot 101 is placed in the at least one warning region BL1, the location warning controller 143 sends a warning message setting signal through the third wireless communication unit 141.

In addition, upon determination that the user terminal module 102 or the mobile robot 101 is placed in the theft risk region, the location warning controller 143 sends an antitheft message setting signal through the third wireless communication unit 141.

Then, the terminal controller 124 of the user terminal module 102 controls the alarm operation of the alarm unit 125 to display a preset loss and departure guide message through at least one alarm device of the alarm unit 125 in response to the warning message setting signal sent from the monitoring device 104 through the first wireless communication unit 121.

Further, the terminal controller 124 of the user terminal module 102 operates in the antitheft mode and controls the alarm operation of the alarm unit 125 to display a preset antitheft warning message through the at least one alarm device of the alarm unit 125 in response to the antitheft message setting signal sent from the monitoring device 104 through the first wireless communication unit 121.

On the other hand, in the course of assisting in driving in one mode selected from among the user tracking mode, the standby mode and the drive power support mode, the main controller 200 of the mobile robot 101 controls the alarm operation of the interface module 500 to display a preset loss and departure guide message through at least one alarm device of the interface module 500 in response to the warning message setting signal sent from the monitoring device 104 through the second wireless communication unit 600.

Furthermore, in the course of assisting in driving in one mode selected from among the user tracking mode, the standby mode and the drive power support mode, the main controller 200 of the mobile robot 101 operates in the antitheft mode and controls the alarm operation of the interface module 500 to display a preset antitheft warning message through the at least one alarm device of the interface module 500 in response to the antitheft message setting signal sent from the monitoring device 104 through the second wireless communication unit 600.

According to the embodiments described above, the antitheft system of the mobile robot can prevent terminal modules carried by a user and mobile robots capable of being used as shopping carts from being stolen and lost, thereby improving reliability thereof.

In addition, the antitheft system can automatically detect the distance between a user carrying a terminal module and the mobile robot in real time to allow the terminal module and the mobile robot to operate simultaneously in an antitheft mode, thereby further improving user convenience and satisfaction.

Further, the monitoring device of the antitheft system monitors the locations of the user terminal modules and the mobile robots in real time and allows the terminal modules and the mobile robots to perform an antitheft operation depending upon a region in which the terminal modules and the mobile robots are placed, thereby further improving efficiency in management of the terminal modules and the mobile robots.

Although some embodiments have been described herein with reference to the accompanying drawings, it should be understood that these embodiments are provided for illustration only and are not to be construed in any way as limiting the present disclosure, and that various modifications, changes, alterations, and equivalent embodiments can be made by those skilled in the art without departing from the spirit and scope of the present disclosure.

The invention claimed is:

1. An antitheft system comprising:
a user terminal configured to generate terminal location data comprising location coordinates of the user terminal; and
a mobile robot configured to:
operate in a user tracking mode for causing the mobile robot to follow the user terminal,
operate in a standby mode or a drive power support mode based on a location of the user terminal and a distance between the mobile robot and the user terminal, and
operate in an antitheft mode when the distance between the mobile robot and the user terminal exceeds a preset antitheft reference distance,
wherein the user terminal comprises:
a first sensing module configured to generate the location coordinates of the user terminal in response to a Global Positioning System (GPS) signal or a near-field wireless communication signal;
a first location detector configured to generate the terminal location data comprising the location coordinates of the user terminal and a preset identification code corresponding to the user terminal;
a first wireless communication unit configured to transmit the terminal location data to the mobile robot and a monitoring device, and receive robot location data from the mobile robot through wireless Internet communication with the mobile robot or the monitoring device;
a terminal controller configured to calculate the distance between the mobile robot and the user terminal in real time through comparison of the location coordinates of the user terminal module and location coordinates of the mobile robot, and operate in the antitheft mode when the distance between the mobile robot and the user terminal exceeds the preset antitheft reference distance; and
an alarm unit configured to output a theft and loss alarm operation under control of the terminal controller, the alarm unit comprising at least one of an image display panel, a speaker or a lighting apparatus.

2. The antitheft system according to claim 1, wherein the user terminal is further configured to:
receive the robot location data comprising the location coordinates of the mobile robot,
calculate the distance between the mobile robot and the user terminal in real time based on a comparison of the location coordinates of the user terminal and the location coordinates of the mobile robot, and
operate in the antitheft mode when the distance between the mobile robot and the user terminal exceeds the preset antitheft reference distance.

3. An antitheft system comprising:
a user terminal configured to generate terminal location data comprising location coordinates of the user terminal; and
a mobile robot configured to:
operate in a user tracking mode for causing the mobile robot to follow the user terminal,
operate in a standby mode or a drive power support mode based on a location of the user terminal and a distance between the mobile robot and the user terminal, and
operate in an antitheft mode when the distance between the mobile robot and the user terminal exceeds a preset antitheft reference distance,
wherein the mobile robot comprises:
a frame module constituting a main body of the mobile robot;
a drive assistance unit configured to supply power to a drive wheel of the frame module;
a second location detector configured to:
detect location and distance data with respect to the user terminal,
generate robot location data comprising location coordinates of the mobile robot and an identification code corresponding to the mobile robot, and
transmit the robot location data to a second wireless communication unit in the mobile robot; and
a main controller configured to control the drive assistance unit by setting the mobile robot to drive in the user tracking mode based on the location and distance data with respect to the user terminal, or by control the drive assistance unit to operate in the drive power assistance mode when a manual driving detector detects a user input.

4. The antitheft system according to claim 3, wherein the second location detector comprises:
a second sensing module configured to detect distance and orientation data of the user terminal;
a camera module configured to photograph the user terminal for detecting an orientation of the user terminal; and
a user location detector configured to receive the distance and orientation data of the user terminal to generate location coordinate data of the user terminal, and generate location coordinate comparison data of the user terminal based on reference coordinates of the second location detector by comparing reference coordinate data of a robot location detector in the mobile robot with the location coordinate data of the user terminal.

5. The antitheft system according to claim 3, wherein the second location detector is further configured to:
detect the location coordinates of the mobile robot in response to a Global Positioning System (GPS) signal received through a GPS communication module, and
generate the robot location data comprising the location coordinates and the identification code corresponding to the mobile robot to transmit the robot location data to the user terminal through the second wireless communication unit.

6. The antitheft system according to claim 3, wherein the main controller of the mobile robot is further configured to:
compare the distance data with the preset antitheft reference distance in real time, and
in response to determining that the distance between the mobile robot and the user terminal exceeds the preset antitheft reference distance, operate in the antitheft mode and output an alarm operation by the mobile robot.

7. The antitheft system according to claim 6, wherein the main controller comprises:
a location data confirmation unit configured to receive location coordinate data of the user terminal and coordinate data of the second location detector in real time, and generate movement course data of the user terminal based on a comparison of the location coordinate data of the user terminal and the coordinate data of the second location detector;
a drive mode setting unit configured to automatically set the mobile robot in the user tracking mode, the standby mode, or the drive power assistance mode based on the comparison of the location coordinate data of the user terminal and the coordinate data of the second location detector;
a drive course setting unit configured to compare the movement course data of the user terminal with current location coordinate data of the second location detector to generate a comparison result, and set a drive course for the mobile robot in real time based on the comparison result when the mobile robot is set in the user tracking mode by the drive mode setting unit; and
a plurality of motor control signal generators configured to control first and second motor controllers of the drive assistance unit to drive the mobile robot along the drive course while maintaining a preset distance between the mobile robot and the user terminal.

8. The antitheft system according to claim 7, wherein the drive mode setting unit is further configured to:
in response to determining that the user terminal is within in the preset antitheft reference distance and outside a preset neutral zone around the mobile robot, set the mobile robot in the user tracking mode to follow the user terminal, and
in response to determining that the user terminal is farther away from the mobile robot than the preset antitheft reference distance, set the mobile robot in the antitheft mode and output the alarm operation by the mobile robot.

9. An antitheft system comprising:
a user terminal configured to generate terminal location data comprising location coordinates of the user terminal;
a mobile robot configured to assist in driving of the mobile robot by selecting a preset drive mode for the mobile robot based on a location of the user terminal and a distance between the mobile robot and the user terminal, and generate robot location data of the mobile robot in real time; and
a monitoring device configured to monitor locations of the user terminal and the mobile robot in real time, and control the user terminal and the mobile robot to perform an antitheft operation based on a region in which the user terminal and the mobile robot are located,
wherein the monitoring device comprises:
a third wireless communication configured to receive the terminal location data and the robot location data;
a reference zone setting unit configured to classify regions into at least one activity region, at least one warning region and a theft risk region, and set location coordinates defining each of the regions;
a location data confirmation unit configured to display comparison results through a monitor based on comparing the location coordinates of the user terminal and location coordinates included in the robot location data with the location coordinates defining the at least one activity region, the at least one warning region and the theft risk region, in real time; and
a location warning controller configured to:
in response to determining that the user terminal or the mobile robot is located in the at least one warning region, transmit a warning message setting signal to at least one of the user terminal and the mobile robot via the third wireless communication unit, and
in response to determining that the user terminal or the mobile robot is located in the theft risk region, transmit an antitheft message setting signal to at least one of the user terminal and the mobile robot via the third wireless communication unit.

10. The antitheft system according to claim 9, wherein the user terminal is further configured to:
in response to receiving the warning message setting signal from the monitoring device, output a preset loss and departure guide message by at least one alarm device of the user terminal, and
in response to receiving the antitheft message setting signal from the monitoring device, operate in an antitheft mode and output a preset antitheft warning message through the at least one alarm device of the user terminal.

11. The antitheft system according to claim 9, wherein the mobile robot is further configured to:
in response to receiving the warning message setting signal from the monitoring device, output a preset loss and departure guide message by at least one alarm device of the mobile robot while continuing to assist in the driving of the mobile robot, and
in response to receiving the antitheft message setting signal from the monitoring device, operate in an antitheft mode and output a preset antitheft warning message through the at least one alarm device of the mobile robot.

12. The antitheft system according to claim 11, wherein the mobile robot comprises:
a frame module constituting a main body of the mobile robot;
a drive assistance unit configured to supply power to a drive wheel of the frame module;
a second location detector configured to:
detect location and distance data with respect to the user terminal,
generate robot location data comprising location coordinates of the mobile robot and an identification code corresponding to the mobile robot, and
transmit the robot location data to a second wireless communication unit in the mobile robot; and
a main controller configured to control the drive assistance unit by setting the mobile robot to drive in a user tracking mode for following the user terminal based on the location and distance data with respect to the user terminal, or control the drive assistance unit to operate in a drive power assistance mode when a manual driving detector detects a user input.

13. The antitheft system according to claim 12, wherein the main controller of the mobile robot is further configured to:
   compare the distance data with a preset antitheft reference distance in real time, and
   in response to determining that the distance between the mobile robot and the user terminal exceeds the preset antitheft reference distance, operate in the antitheft mode and output an alarm operation by the mobile robot.

14. The antitheft system according to claim 13, wherein the main controller comprises:
   a location data confirmation unit configured to receive location coordinate data of the user terminal and coordinate data of the second location detector in real time, and generate movement course data of the user terminal based on a comparison of the location coordinate data of the user terminal and the coordinate data of the second location detector;
   a drive mode setting unit configured to automatically set the mobile robot in the user tracking mode, a standby mode, or the drive power assistance mode based on the comparison of the location coordinate data of the user terminal and the coordinate data of the second location detector;
   a drive course setting unit configured to compare the movement course data of the user terminal with current location coordinate data of the second location detector to generate a comparison result, and set a drive course for the mobile robot in real time based on the comparison result when the mobile robot is set in the user tracking mode by the drive mode setting unit; and
   a plurality of motor control signal generators configured to control first and second motor controllers of the drive assistance unit to drive the mobile robot along the drive course while maintaining a preset distance between the mobile robot and the user terminal.

15. The antitheft system according to claim 14, wherein the drive mode setting unit is further configured to:
   in response to determining that the user terminal is within in the preset antitheft reference distance and outside a preset neutral zone around the mobile robot, set the mobile robot in the user tracking mode to follow the user terminal, and
   in response to determining that the user terminal is farther away from the mobile robot than the preset antitheft reference distance, set the mobile robot in the antitheft mode and output the alarm operation by the mobile robot.

16. A mobile robot for operating in an antitheft system, the mobile robot comprising:
   a frame constituting a main body of the mobile robot;
   a drive assistance unit configured to supply power to a drive wheel of the frame; and
   a controller configured to:
   operate in a user tracking mode for causing the mobile robot to follow a user terminal,
   operate in a standby mode or a drive power support mode based on a location of the user terminal and a distance between the mobile robot and the user terminal, and
   operate in an antitheft mode when the distance between the mobile robot and the user terminal exceeds a preset antitheft reference distance,
   wherein the controller is further configured to:
   in response to receiving a warning message setting signal from a monitoring device, output a preset loss and departure guide message by at least one alarm device of the mobile robot while continuing to assist in the driving of the mobile robot, and
   in response to receiving an antitheft message setting signal from the monitoring device, operate in an antitheft mode and output a preset antitheft warning message through the at least one alarm device of the mobile robot.

17. The mobile robot according to claim 16, further comprising:
   a location detector configured to:
   detect location and distance data with respect to the user terminal,
   generate robot location data comprising location coordinates of the mobile robot and an identification code corresponding to the mobile robot, and
   transmit the robot location data to a wireless communication unit in the mobile robot.

* * * * *